United States Patent
Kiefl et al.

(10) Patent No.: US 10,765,134 B2
(45) Date of Patent: Sep. 8, 2020

(54) FOODSTUFF CONTAINING CITRUS PRODUCTS HAVING ADDED 4-HYDROXYFLAVANONES

(71) Applicant: SYMRISE AG, Holzminden (DE)

(72) Inventors: Johannes Kiefl, Holzminden (DE); Susanne Paetz, Höxter (DE); Jakob Ley, Holzminden (DE); Gerhard Krammer, Holzminden (DE); Thomas Riess, Holzminden (DE); Kathrin Langer, Dassel-Hilwartshausen (DE); Günter Kindel, Höxter (DE); Morine Verwohlt, Linnenkamp (DE)

(73) Assignee: SYMRISE AG, Holzminden (DE)

( * ) Notice: Subject to any disclaimer, the term of this patent is extended or adjusted under 35 U.S.C. 154(b) by 187 days.

(21) Appl. No.: 15/755,599

(22) PCT Filed: Sep. 1, 2015

(86) PCT No.: PCT/EP2015/069971
§ 371 (c)(1),
(2) Date: Feb. 27, 2018

(87) PCT Pub. No.: WO2017/036518
PCT Pub. Date: Mar. 9, 2017

(65) Prior Publication Data
US 2019/0021378 A1    Jan. 24, 2019

(51) Int. Cl.
| | |
|---|---|
| *A23L 19/00* | (2016.01) |
| *A23L 27/00* | (2016.01) |
| *A23L 27/12* | (2016.01) |
| *A23L 27/20* | (2016.01) |

(52) U.S. Cl.
CPC .............. *A23L 19/07* (2016.08); *A23L 27/13* (2016.08); *A23L 27/2052* (2016.08); *A23L 27/84* (2016.08); *A23L 27/86* (2016.08); *A23V 2002/00* (2013.01); *A23V 2200/16* (2013.01)

(58) Field of Classification Search
CPC .......... A23L 19/07; A23L 27/86; A23L 27/84; A23L 27/13; A23L 27/2052; A23V 2200/16
USPC .......................................... 426/616
See application file for complete search history.

(56) References Cited

U.S. PATENT DOCUMENTS

| 8,685,436 B2 * | 4/2014 | Ley et al. |
| 2010/0151055 A1 * | 6/2010 | Riess et al. |
| 2011/0293538 A1 | 12/2011 | Ley et al. |

FOREIGN PATENT DOCUMENTS

| CA | 633148 A | 12/1961 |
| EP | 1258200 A2 | 11/2002 |
| EP | 2732711 A1 | 5/2014 |
| JP | 2002360188 A | 12/2002 |
| JP | 2015504077 A | 2/2015 |

OTHER PUBLICATIONS

International Search Report dated Apr. 28, 2016 for corresponding PCT Application No. PCT/EP2015/069971.
Ferreira, Luis et al., "Evaluation of the effect of high pressure on naringin hydrolysis in grapefruit juice with naringinase immobilised in calcium alginate beads", Food Technology and Biotechnology, vol. 46, Nr. 2, 2008, pp. 146-150.
Japanese Office Action dated Dec. 1, 2019 for corresponding JP Application No. 2018-511410.
Dagulo, L. et al., "Chemical Characterization of Orange Juice from Trees Infected with Citrus Greening (Huanglongbing)," Journal of Food Science, vol. 75, No. 2, 2010; pp. C199-C207.
Dea, S. et al., "Interactions and Thresholds of Limonin and Nomilin in Bitterness Perception in Orange Juice and Other Matrices," Journal of Sensory Studies, vol. 28, 2013; pp. 311-323.

* cited by examiner

*Primary Examiner* — Helen F Heggestad
(74) *Attorney, Agent, or Firm* — Polsinelli PC

(57) ABSTRACT

The invention relates to a foodstuff, containing: a) juice, pith, flesh, skins; or other constituents of at least one citrus fruit, b) at least one 4-hydroxyflavanone of the formula (I), in which $R_1$ represents hydrogen or a hydroxy group a or methoxy group and the carbon atom at the position (C2) designated by * is present in a (2S) or a (2R) configuration or in any mixture of the two configurations, and also, if applicable, c) further flavorings or flavoring preparations, with the proviso that the constituent (b) is present in a sufficient quantity to improve the acidic and/or bitter taste of the constituent (a).

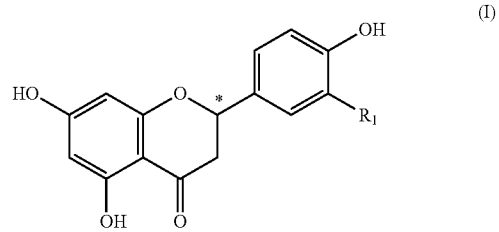

10 Claims, No Drawings

FOODSTUFF CONTAINING CITRUS PRODUCTS HAVING ADDED 4-HYDROXYFLAVANONES

CROSS-REFERENCE TO RELATED APPLICATIONS

This application is a national stage application (under 35 U.S.C. § 371) of PCT/EP2015/069971, filed Sep. 1, 2015, which is incorporated herein by reference in its entirety.

FIELD OF THE INVENTION

The invention is on the field of food products and relates to food products containing citrus and particularly orange products with added 4-hydroxyflavanones with the aim of the reduction of the unpleasant particularly the sour and bitter taste of these food products.

STATE OF THE ART

Food products, particularly drinks, which are mainly produced from fruits of various citrus species, play an prominent role in the international food product market. Here, especially orange juice (*Citrus* x *sinensis* L. or *Citrus* x *aurantium*) in the form of direct juice or reconstituted juice from concentrate and food products based on orange juice such as nectars or fruit juice drinks are to be mentioned. In addition to the typical citrus/orange aroma, especially a balanced sweetness in combination with a sour taste impression and also a certain bitterness are crucial for the sensory quality of such drinks.

Within the last years, the infection of the fruit-bearing trees in the plantations with Huanglongbing-bacterium (e.g. *Liberobacter* ssp., so-called "Greening disease") which is spread by Psylloidea increases, which results in insufficiently developed and misery matured fruits. The juice obtained thereof usually is less sweet and substantially more sour than the juice obtained from healthy fruit material. Additionally, a substantially stronger bitterness is observed, which is far above the tolerated or required part. Up to a certain proportion, the infected but per se edible fruits may be tolerated in the juices or juice products, in case the proportion becomes too high, particularly the sour taste and the bitterness is clearly observable by the consumer and results in complaints.

It is known from EP 2494874 B1 (TROPICANA PRODUCTS), that a few ingredients of citrus fruits exceeding an individual limit concentration are responsible for the bitter and sour taste, however, no precise teaching is given, how these substances can be reduced to obtain products with proper taste. As far as methods are known from the state of the art, with which such a reduction may be carried out, a loss of further ingredients or a shift in the aroma profile would occur, which is not tolerated. The easiest method is the addition of cane sugar or fructose, which is however in many applications not allowed for regulatory reasons.

Thus, it was the object of the present invention, to find flavouring agents or mixtures of flavouring agents, which are already in low concentration capable of reducing or erasing the unpleasant, particularly the sour and the bitter taste of sour and bitter tasting food products and thus of citrus products in general and of orange products specifically, and preferably also to enhance the sweet taste. Additionally, the additives should be naturally occurring and preferably be able to be obtained by ingredients of the genus *Citrus*.

DESCRIPTION OF THE INVENTION

A first aspect of the invention relates to food products, containing
(a) juice, marrow, flesh or peels or other components of at least one citrus fruit,
(b) at least one 4-hydroxyflavanone of the formula (I)

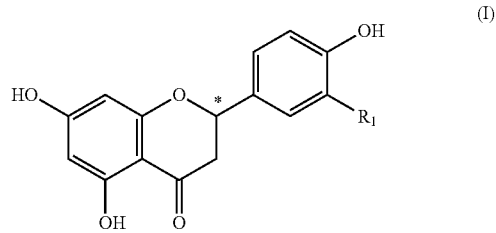

wherein $R_1$ denotes hydrogen or a hydroxy or methoxy group and the carbon atom at the position (C2) marked by * is present in a (2S) or a (2R) configuration or in an arbitrary mixture of both configurations, as well as optionally
(c) further flavouring agents or flavour preparations,
providing that component (b) is present in a sufficient amount to improve the sour and/or bitter taste of component (a).

The 4-hydroxyflavanones naringenin and eriodictyol for example are usually present only as bound glycosides in citrus fruits; thus e.g. as Narirutin (Naringenrutinoside) in a range of 1 to 50 ppm in orange juice (Gil-Izquierdo, A.; Gil, M. I.; Ferre res, F.; Tomas-Barberan, F. A., "*In Vitro Availability of Flavonoids and Other Phenolics in Orange Juice*" J. Agric. Food Chem. 2001, 49, (2), 1035-1041) or as Naringin (naringenin neohesperidioside) in lemons (*Citrus lemon*) or grapefruit (*Citrus maxima*). In oranges, contrary to lemons and limes, eriodictyol was only described in traces. homoeriodictyol was not described in citrus fruits, particularly in oranges, yet.

naringenin, Hesperetin and eriodictyol in free form are not present in orange juices in a concentration (>5 ppm) sufficient for the effect according to the invention. Thus, in Yanez, J. A.; Remsberg, C. M.; Miranda, N. D.; Vega-Villa, K. R.; Andrews, P. K.; Davies, N. M., "*Pharmacokinetics of selected chiral flavonoids: hesperetin, naringenin and eriodictyol in rats and their content in fruit juices*" Biopharmaceutics & Drug Disposition 2008, 29, (2), 63-82, naringenin was described in orange juices with maximal 0.5 ppm. eriodictyol is present only in traces, homoeriodictyol was not described. In grapefruit juices, however, an amount of naringenin of up to approx. 2.06 ppm was found, which is however a regularly too low concentration for taking the masking effect, particularly as in the same juices the 250-fold concentration of the very bitter Naringin was found, which is not present in oranges and is thus not responsible for their bitterness. In lemon or lime juice containing drinks, contrary to orange drinks, up to 28 ppm eriodictyol was found, in this case of course covered by an extremely strong sour taste.

Therefore, it was surprising that the addition of an effective amount of at least 5 ppm of 4-hydroxyflavanones (related to the citrus component) to sour and bitter citrus products and especially to food products containing orange juice clearly reduces the perception of the acid and simultaneously noticeably reduces the bitterness and in parallel causes a clear increase of the sweetness. Particularly it is surprising that the perception of the acid is perceived as strongly reduced despite an unchained pH value. The decrease of the sour taste is thereby also achieved without an increase of the perception of sweetness.

Food Products

The food products of the present invention are preferably drinks or desserts.

Examples for drinks containing citrus comprise the group consisting of freshly pressed, direct juices, reconstituted juices from juice concentrate, nectars, saftschorle, refreshing drinks containing juice, milk products containing juice, carbonised drinks containing juice as well as iced tea containing juice.

Examples for desserts containing citrus are found in the group consisting of yoghurts, frozen ice products, sorbets, ice cream, creams, puddings, fillings for chocolate or cookie products, jams as well as dried juice or fruit preparations.

Citrus Products

In the sense of the present invention, the term citrus products is to be understood as the juice, the marrow, the flesh, the peels as well as all further components of citrus fruits; in the following it is used as a synonym for the group (a). Oranges, grapefruits, lemons, limes, mandarins and their mixtures belong to the citrus fruits, the bitter and/or sour taste of which is to be improved.

Group (a) particularly comprises sour and bitter orange products: orange varieties (*Citrus* x *sinensis* L. or *Citrus* x *aurantium*, Var. Hamlin, Valencia) derived from the genus *Citrus*, products derived from particularly a proportion of premature or misery matured oranges of HLB infected trees such as juices, juice concentrates, juice fractions with or without albedo part, with or without pulp.

Preferably, minimum concentrations of specific bitter substances as well as maximum concentrations of natural 4-hydroxyflavanones apply for citrus products, particularly at least 0.1 ppm and particularly about 3 to 5 ppm limonin, at least 5 ppm and particularly 8 to 15 ppm polymethoxylated flavanones, at least 200 ppm and particularly 300 to 600 ppm hesperidin, maximal 2.5 ppm and particularly maximal 1 ppm of each naringenin, eriodictyol or homoeriodictyol, wherein the specifications each relate to compound (a).

Furthermore, the citrus products forming group (a) should have a pH value in the range of 3 to 6.

4-Hydroxyflavanones 4-hydroxyflavanones are known natural compounds, which are obtainable by common methods of organic chemistry. Preferably as component (b) are included:

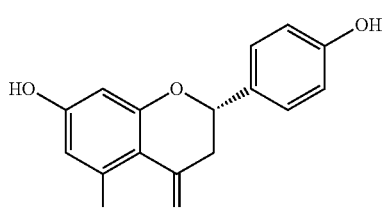

Naringenin

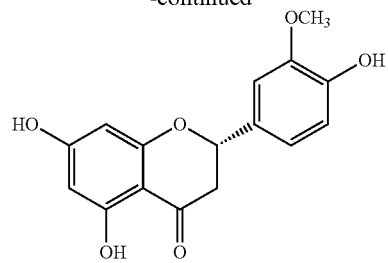

Homoericodictyol

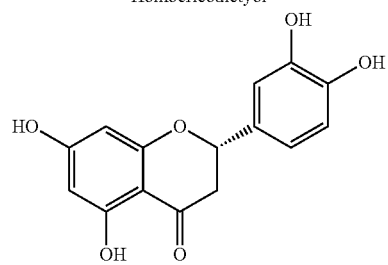

Eriodictyol

The teaching of the present invention comprises the fact that the 4-hydroxyflavanones are present in arbitrary form of the respective stereoisomers. In a preferred embodiment of the invention, the food products contain 4-hydroxyflavanones of formula (I), in which the (2S)- and (2R)-enantiomers are present in a weight ratio of 99:1 to 1:99 and particularly of about 90:10 to about 45:55.

It is sufficient for a compensation of the sour and/or bitter taste if the 4-hydroxyflavanones of formula (I) are present, added or specifically produced in amounts of about 5 to about 1000 ppm and particularly about 30 to about 250 ppm and particularly preferably about 50 to about 100 ppm related to compound (a).

Flavouring Agents

Optionally, the food products can contain further flavouring agents or flavour preparations as component (c). These can be selected from substances for altering or masking of an unpleasant taste impression and/or for enhancing of a pleasant taste impression. Taste correctants are preferably selected from the following group: hesperetin as described in EP 2,368,442 B1 or EP 1,909,599-B1, hydroxybenzoic acid amides as e.g. 2,4-dihydroxybenzoic acid vanillylamide (particularly such as described in WO 2006/024587), 4-hydroxydihydrochalcones (preferably as described in us 2008/0 227867 A1 and WO 2007/107596), here particularly phloretin and davidigenin, hesperetin as disclosed in WO 2007/014879, or extracts from *rubus* suavissimus as described in U.S. provisional application 61/333,435 (Symrise) and the patent applications based thereon, 3,7'-dihydroxy-4'-methoxyflavan isomeres as described in EP 2,253,226, phyllodulcin isomers or extracts containing phyllodulcinas described in EP 2,298,084 B1, 1-(2,4-dihydroxy-phenyl)-3-(3-hydroxy-4-methoxy-phenyl)-propane-1-one as described in EP 2,353,403 B1, neoisoflavonoides as described in EP 2,570,036 B1, pellitorin and derived flavour preparations as described in EP 2,008,530 A1, vanillyllignanes, particularly as described in EP 2,517,574, neoisoflavonoides as described in EP 2,570,035-B1, neohesperidin dhydrochalkone, hesperetin dihydrochalkone, hesperidin dihydrochalkone, naringin dihydrochalkone, phloridzin, trilobatin, steviosides and/or rebaudiosides, particularly various mixtures of different rebaudiosides as described in WO 2015,062,998, rubusosides as described in EP 2,386,211, mixtures of rubusoside-isomeres and -homologues, mogrosides, abrusosides and/or balansine as described in WO 2012,164,062.

Further flavouring agents or flavour preparations can be selected from the list of volatile flavouring agents, e.g. acetaldehyde, acetophenone, alpha-cadinol, alpha-copaene, alpha-cubebene, alpha-humulene, alpha-pinene, alpha-terpinene, alpha-terpineol, anisaldehyde, benzaldehyde, benzophenone, beta-copaene, beta-cubebene, beta-cyclocitrale, beta-elemene, beta-Ionone, beta-myrcene, beta-ocimene, beta-pinene, butanol, butyl acetate, camphene, caryophyllene, cis-4-decenal, cis-4-heptenal, cis-3-hexenal, cis-3-hexenol, cis-8-tetradecenal, citral, citronellol, citronellal, citronellyl acetate, cubenol, decanal, decanol, decyl acetate, (e,e)-2,4-decadienal, delta-3-carene, delta-cadinol, deltacarenee, di hydronootkatone, di methylanthranilate, dodecanal, dodecanol, dodecenal, elemol, ethoxyethyl acetate, ethyl-2-hexanol, ethyl-2-methyl butyrate, ethyl-3-hydroxy hexanoate, ethyl-3-hydroxy octanoate, ethyl acetate, ethyl butyrate, ethyl caprinate, ethyl capronate, ethyl caprylate, ethyl crotonate, ethy propionate, eucalyptol, eugenol, fenchol, gama-eudesmol, gamma-butyrolactone, gamma-terpinene, geranial, geraniol, geranyl acetate, heptanal, heptanol, heptyl acetate, hexanal, hexanol, hexyl acetate, isoamyl alcohol, isobutanol, isocascarilla acid, iso-piperitenol, isopulegol, limonene, linalool, 12-methyltridecanal, menthadienol, menthadiene, methyl-3-hexanoate, methyl-3-hydroxyoctanoate, methtyrat, methylcapronate, methylcaprylate, methyldihydrojasmonate, methylsalicylate, (e,e)-2,4-nonadienal, neral, nerol, neryl acetate, nonanal, nonanol, nootkatene, nootkatol, nootkatone, octanal, octanol, octyl acetate, pentanol, perillaaldehyde, phenylethanol, piperitenone, rotundone, sinensal, terpinoiene, trans-2-ethylhexenoate, trans-2-heptenal, trans-2-hexenal, trans-2-hexenal, trans-2-nonenal, trans-2-octenal, trans-2-pentenal, 2-undecenal, undecanal, valencen, 1-penten-3-on in form of arbitrary stereoisomers, enantiomers, positional isomers, diastereomers, cis/trans isomers or epimers of these substances.

Flavouring Preparations

A further embodiment of the invention relates to flavour preparations, containing
(a) at least one 4-hydroxyflavanone of formula (I) and
(b) at least one further flavouring agent.

The proportion of the 4-hydroxyflavanones in general and naringenin, homoeriodictyol and/or eriodictyol in particular in these preparations can be 0.1 to 99.9 wt.-%, preferably about 0.5 to about 25 wt.-% and particularly about 1 to about 10 wt.-%. As further flavouring agents, the substances listed above come into question. The flavouring agents can be encapsulated and/or adsorbed and/or emulsified or can be added to the preparation in such a form.

Capsules

The 4-hydroxyflavanones forming group (b) as well as flavour preparations which may contain these substances can be present in encapsulated form and be added as capsules to the food products. Capsules are meant to be understood as spherical aggregates, containing at least one solid or liquid core, which is coated by at least one continuous membrane. The fragrances can be encapsulated with coating materials and thus be present as macrocapsules with a diameter of about 0.1 to about 5 mm or as microcapsules with a diameter of about 0.0001 to about 0.1 mm.

Coating Materials suitable coating materials are for example starches, including their metabolites as well as chemically or physically produced derivates (particularly dextrines and maltodextrines), gelatine, gum *arabicum*, agar-agar, ghatti gum, gellan gum, modified and nonmodified celluloses, pullulan, curdlan, carrageenanes, alginic acid, alginates, pectin, inulin, xanthan gum and mixtures of two or more of these substances.

The solid coating material is preferably a gelatine (particularly swine, bovine, poultry and/or fish gelatine), preferably having a sulphur factor of higher than or equal to 20, preferably higher than or equal to 24. Among these substances, gelatine is particularly preferred, as it is well available and can be obtained with different swelling factors.

Preferred as well are maltodextrines (particularly on a grain base, especially corn, wheat, tapioca or potatoes) preferably having de values in the range of from 10 to 20. Further preferred are celluloses (e.g. cellulose ether), alginates (e.g. sodium alginate), carrageenane (e.g. beta-, jota-, lambda-, and/or kappa-carrageenane, gum *arabicum*, cirdlan and/or agar-agar.

Additionally preferred are alginate capsules as they are extensively described e.g. in the following documents EP 0389700 A1, U.S. Pat. Nos. 4,251,195, 6,214,376, WO 2003 055587 or WO 2004 050069 A1.

In a further preferred embodiment, the membrane of the capsules consists of Melamin-formaldehyde resins or coacervation products of cationic monomers or biopolymers (as e.g. Chitosam) and anionic monomers, such as (meth) acrylates or alginates.

Methods for Encapsulation

The capsules are in general finely disperse, liquid or solid phases coated by film-forming polymers, at the production of which the polymers precipitate after emulsification and coacervation or surface polymerization on the material to be coated. According to another method, molten waxes are incorporated into a matrix ("microsponge"), which can, as microparticles, be additionally coated with film-forming polymers. According to a third method, particles are alternately coated with polyelectrolytes of different charge ("layer-by-layer" method). The microscopically small capsules can be dried as powder. In addition to mononuclear microcapsules, also polynuclear aggregates, also called microspheres, are known, which contain two or more cores distributed in the continuous membrane material. Mono- or polynuclear microcapsules can additionally be coated by a further second, third, etc. Membrane. This membrane can consist of natural, semisynthetis or synthetic materials. Natural membrane materials are e.g. gum *arabicum*, agar-agar, agarose, maltodextrines, alginic acid and the salts thereof, e.g. sodium or calcium alginate, fats and fatty acids, cetylalcohols, collagen, chitosane, lecithines, gelatine, albumin, shellac, polysaccharides such as starch or dextran, polypeptides, protein hydrolysates, sucrose and waxes. Semisynthetic membrane materials are among others chemically modified celluloses, particularly cellulose ester and ether, e.g. cellulose acetate, ethyl cellulose, hydroxypropyl cellulose, hydroxypropylmethyl cellulose and carboxymethyl cellulose, as well as starch derivatives, particularly starch ethers and esters. Synthetic membrane materials are e.g. polymers as polyacrylates, polyamides, polyvinylalcohols or polyvinylpyrrolidone.

Examples for microcapsules in the state of the art are the following commercial products (the respective membrane material is given in brackets): Hallcrest Microcapsules (gelatine, gum *arabicum*), Coletica Thalaspheres (maritime collagen), Lipotec Millicapsules (alginic acid, agar-agar), lnduchem Unispheres (lactose, microcrystalline cellulose, hydroxypropylmethyl cellulose); Unicerin C30 (lactose, microcrystalline cellulose, Hydroxypropylmethyl cellulose), Kobo Glycospheres (modified starch, fatty acid ester, phospholipids), Softspheres (modified agar-agar) and Kuhs Probiol Nanospheres (phospholipids) as well as Primaspheres and Primasponges (chitosan, alginates) and Primasys (phospholipids).

Chitosan microcapsules and methods for their production are well known in the state of the art [WO 01/01926, WO 01/01927, WO 01/01928, WO 01/01929]. Microcapsules with a mean diameter in the range of 0.0001 to 5, preferably 0.001 to 0.5 and particularly 0.005 to 0.1 mm, consisting of a membrane and a matrix containing the active substances can be obtained by
(a) preparing a matrix from gelling agents, cationic polymers and active substances,
(b) optionally dispersing the matrix in an oil phase,
(c) treating the dispersed matrix with aqueous solutions of anionic polymers and optionally removing the oil phase thereby.

The steps (a) and (c) are variably by replacing the cationic polymers in step (a) with anionic polymers and vice versa.

The capsules can also be produced by coating the active substance alternately with layers of differently charged polyelectrolytes (layer-by-layer technology). In this context it is referred to the European Patent EP 1064088 B1 (Max-Planck Gesellschaft).

INDUSTRIAL APPLICATION

A further aspect of the invention relates to a method of reducing the sour and/or bitter taste of citrus fruit products, comprising the following steps:
(i) Providing a citrus fruit product, the sour and/or bitter taste of which shall be improved and
(ii) Adding or specifically producing an amount, which is improving the taste, of at least one 4-hydroxyflavanone of formula (I), preferably of from about 5 to about 1000 ppm and particularly from about 30 to about 250 ppm—related to the citrus component.

Instead of the 4-hydroxyflavanones, of course a flavouring mixture comprising these can be used.

Additionally claimed is the use of 4-hydroxyflavanones of formula (I) or flavour preparations comprising these for the improvement of the sour and/or bitter taste of citrus fruit products, wherein the amount added or the amount specifically produced again is preferably from about 5 to about 1000 ppm and particularly from about 30 to about 250 ppm related to the citrus component.

As far as a preferred selection of components and additives as well as indications of quantities was made above, it also applies for the method according to the invention as well as the use without requiring a repetition thereof.

EXAMPLES

Examples 1 to 5

Masking the perception of sour and the bitterness in orange juice, which was obtained from premature fruits and/or HLB infected fruits with at least 5 ppm limonin A commercial orange juice was used for the experiments, which according to an analysis contains 7.8 ppm limonin and was regularly evaluated as too bitter from the panellists. The panellists (n=6) thereby evaluate the 3 attributes "sweet", "bitter" and "sour" on an unstructured scale of 0 (no taste) to 10 (strong taste). In one sample, the panellists received the orange juice alone, in a further sample, they received the orange juice which was supplemented with an amount of 4-hydroxyflavanone as listed in one of the tables. Thereby, the order was arbitrary and not known to the panellists before. In the following table 1, the results of the evaluations of 6 panellists are summed up.

TABLE 1

Evaluation of taste

| EXAMPLE 1 | Evaluation (0-10) | | |
|---|---|---|---|
| | Bitter | Sour | Sweet |
| Orange juice containing 7.8 ppm limonin | 4.9 | 4.4 | 3.9 |
| Orange juice containing 7.8 ppm limonin and 20 ppm racemic naringenin | 3.4 | 3.3 | 5.2 |
| Relative change | −31% | −25% | +30% |

As the examples show, naringenin in a per se low concentration of 20 ppm leads to a clear reduction of the bitter taste, a decrease of the sour impresseion and a simultaneous increase of the sweet impression and an improvement of the total taste profile of the examined orange juice. In the following table 2, the results of an addition of eriodictyol are given.

TABLE 2

Evaluation of taste

| EXAMPLE 2 | Evaluation (0-10) | | |
|---|---|---|---|
| | Bitter | Sour | Sweet |
| Orange juice containing 7.8 ppm limonin | 4.7 | 5.5 | 4.0 |
| Orange juice containing 7.8 ppm limonin and 10 ppm racemic eriodictyol | 3.2 | 4.4 | 5.1 |
| Relative change | −32% | −20% | +28% |

As the examples show, eriodictyol in a low concentration of 10 ppm also leads to a strong reduction of the bitter taste, a decreased sour perception and increased sweet impression and thus improves the total taste profile of the examined orange juice. In the following tables 3 and 4, the results of an addition of homoeriodictyol-sodium-salt are given.

TABLE 3

Evaluation of taste

| EXAMPLE 3 | Evaluation (0-10) | | |
|---|---|---|---|
| | Bitter | Sour | Sweet |
| Orange juice containing 7.8 ppm limonin | 4.7 | 4.2 | 3.2 |
| Orange juice containing 7.8 ppm limonin and 50 ppm racemic homoeriodictyol-sodium-salt | 4.1 | 3.3 | 4.0 |
| Relative change | −13% | −23% | +24% |

TABLE 4

Evaluation of taste

| EXAMPLE 4 | Evaluation (0-10) | | |
|---|---|---|---|
| | Bitter | Sour | Sweet |
| Orange juice containing 7.8 ppm limonin | 4.5 | 4.7 | 4.6 |
| Orange juice containing 7.8 ppm limonin and 30 ppm racemic homoeriodictyol-sodium-salt | 3.2 | 4.1 | 4.8 |
| Relative change | −27% | −12% | +3% |

As the examples show, homoeriodictyol-sodium-salt in an amount of 30 ppm already leads to a clear reduction of the bitter taste, decreases the sour impression and does not influence the sweet taste here. At 50 ppm, particularly the sour perception is influenced more strongly and it thus improves the total taste profile of the examined orange juice. In the following table 5, the results for eriodictyol and naringenin are given.

TABLE 5

Evaluation of taste

| EXAMPLE 5 | Evaluation (0-10) | | |
|---|---|---|---|
| | Bitter | Sour | Sweet |
| A Orange juice containing 7.8 ppm limonin | 5.0 | 4.9 | 3.0 |
| B Orange juice containing 7.8 ppm limonin and 10 ppm racemic eriodictyol | 3.9 | 4.4 | 4.2 |
| Relative change A/B | −21% | −12% | +40% |
| C Orange juice containing 7.8 ppm limonin and 30 ppm racemic naringenin and 10 ppm racemic eriodictyol | 3.5 | 3.8 | 4.2 |
| Relative change A/C | −29% | −23% | +40% |
| D Orange juice containing 7.8 ppm limonin and 20 ppm racemic naringenin and 10 ppm racemic eriodictyol | 3.3 | 3.5 | 4.7 |
| Relative change A/D | −35% | −29% | +56% |

The combinatory experiments C and D show, that the effects of mixtures of homoeriodictyol and eriodictyol (1E-C) and naringenin and eriodictyol (1E-D) are further causing substantially improved effects, particularly reducing bitterness and sour perception; simultaneously the sweet perception of the drinks was clearly enhanced.

Application Examples from the Field of Drinks with Orange Juice Part

Formulation A

Orange juice drink (all indications of quantities are wt.-%)

| Ingredients | A | B | C | D | E | F | G |
|---|---|---|---|---|---|---|---|
| Orange juice (7.8 ppm limonin) | 50 | 50 | 50 | 50 | 50 | 50 | 50 |
| Water | ad 100 | ad 100 | ad 100 | ad 100 | ad 100 | ad 100 | ad 100 |
| Orange topnote | 0.004 | 0.004 | 0.004 | 0.004 | 0.004 | 0.004 | 0.004 |
| Citric acid | — | — | — | — | 0.1 | 0.05 | — |
| Citrus extract | — | — | — | — | 0.0005 | 0.0003 | — |
| Homoeriodictyol-Na | 0.002 | 0.0015 | — | — | 0.002 | — | 0.001 |
| Phloretin (1%) | 0.20 | — | 0.15 | — | — | — | — |
| Naringenin | — | 0.0015 | 0.0025 | 0.0025 | — | 0.002 | 0.002 |
| Hesperetin | — | — | 0.001 | 0.0015 | — | 0.0005 | — |

Formulation B

Orange juice drink (all indications of quantities are wt.-%)

| Ingredients | A | B | C | D | E | F | G |
|---|---|---|---|---|---|---|---|
| Saccharose | 55 | 55 | 55 | 55 | 55 | 55 | 55 |
| Glucose syrup, DE 40 | 35 | 35 | 35 | 35 | 35 | 35 | 35 |
| Water | 40 | 40 | 40 | 40 | 40 | 40 | 40 |
| Pectin (GenuPectin D100 buffered) | 2.6 | 2.6 | 2.6 | 2.6 | 2.6 | 2.6 | 2.6 |
| Sodiumcitrate | 0.2 | 0.2 | 0.2 | 0.2 | 0.2 | 0.2 | 0.2 |
| Lactic/citric acid mixture (PURAC CL HiPure) | 2 | 2 | 2 | 2 | 2 | 2 | 2 |
| Orange juice concentrate | 2.5 | 2.5 | 2.5 | 2.5 | 2.5 | 2.5 | 2.5 |
| Citrus flavour | 0.20 | 0.20 | 0.20 | 0.20 | 0.20 | 0.20 | 0.20 |
| Naringenin | — | 0.001 | 0.0025 | 0.0015 | — | — | 0.002 |
| Hesperetin | — | — | — | 0.001 | — | 0.001 | — |
| Homoeriodictyol-Na | — | — | — | — | 0.003 | 0.003 | 0.002 |

For the production of formulation B, the dry substances are dissolved in water and boiled with the pectin and sodium citrate for about 3-5 minutes at 106° C. up to a Brix-value of 77-78°. Subsequently, the orange juice concentrate and the flavours are admixed. After slight cooling down, the mass is quickly filled into forms and cooled.

Formulation C

Orange sorbet (all indications of quantities are wt.-%)

| Ingredients | A | B | C | D | E |
|---|---|---|---|---|---|
| Orange juice concentrate (5.5x, 60Bx) | 6 | 6 | 6 | 6 | 6 |
| Sucrose | 21 | 21 | 21 | 21 | 21 |
| Glucose Syrup 72% TS | 11 | 11 | 11 | 11 | 11 |
| Emulsifier/Stabilizer | 0.5 | 0.5 | 0.5 | 0.5 | 0.5 |
| Citric acid (50%) | 0.6 | 0.6 | 0.6 | 0.6 | 0.6 |
| Orange flavour | 0.1 | 0.1 | 0.1 | 0.1 | 0.1 |
| Naringenin | 0.001 | 0.0025 | 0.0015 | — | — |
| Eriodictyol | — | — | 0.0010 | — | 0.001 |
| Hersperetin | — | 0.0010 | — | — | 0.001 |
| Homoeriodictyol-Na | — | — | — | — | 0.003 |
| Homoeriodictyol-K | — | — | — | 0.003 | — |
| Water | Fill up ad 100% | | | | |

For the production, the emulsifier and stabilizer are mixed with sugar and dissolved in water; Glucose syrup is added and dissolved. Subsequently, the mixture is pasteurised and cooled down. Into the mixture, the aroma components and the fruit juice concentrate is added, the pH value is adjusted to 3.8-4.2 with 50% citric acid solution and the composition is fried in an ice machine with 40-80% overrun.

Formulation D

Herb liqueur (all indications of quantities are wt.-%)

| Ingredients | A | B | C | D | E |
|---|---|---|---|---|---|
| Water | 55 | 55 | 55 | 55 | 55 |
| Alcohol 96.5% | 28 | 28 | 28 | 28 | 28 |
| Saccharose | 14 | 14 | 14 | 14 | 14 |
| Caramel sugar syrup 50% water | 2 | 2 | 2 | 2 | 2 |
| Jagdbitter extract 50% Vol | 0.8 | 0.5 | 0.5 | | |
| Citrus peel extract 50% Vol | | | | 0.8 | 0.5 |
| Orange oil bitter | 0.005 | 0.01 | 0.01 | | 0.002 |
| Grapefruit oil 0.1% alc. | 0.05 | 0.01 | 0.01 | | |
| Herb flavour topnote | | | | 0.004 | 0.004 |
| Vanillin | 0.0002 | 0.0002 | 0.0002 | 0.0002 | 0.0002 |
| Naringenin | 0.0015 | 0.003 | 0.002 | 0.003 | 0.0015 |
| Homoeriodictyol-Na | 0.0015 | | 0.002 | | 0.0015 |
| Water | Fill up ad 100% | | | | |

Production: Dissolve sugar with water. Add and dissolve further ingredients. Pasteurise and cool down.

Formulation E

Beer mix drink with grapefruit (all indications of quantities are wt.-%)

| Ingredients | A | B | C | D | E |
|---|---|---|---|---|---|
| Beer type wheat beer 5 Vol.-% | 49 | 49 | 49 | 49 | 49 |
| Carbonised water 6 g/L CO$_2$ | 45 | 45 | 45 | 45 | 45 |
| Saccharose | 4 | 4 | 4 | 4 | 4 |
| Citric acid monohydrate | 0.05 | 0.05 | 0.05 | 0.05 | 0.05 |
| Grapefruit juice concentrate 55 Brix | 0.5 | 0.5 | 0.5 | 0.5 | 0.5 |
| Orange juice concentrate 65 Brix | 0.1 | 0.1 | 0.1 | 0.1 | 0.1 |
| Carminic acid E120 8.2% | 0.015 | 0.015 | 0.015 | 0.015 | 0.015 |
| Vitamin C E300 | 0.011 | 0.011 | 0.011 | 0.011 | 0.011 |
| Potassium sorbate | 0.06 | 0.06 | 0.06 | 0.06 | 0.06 |
| Guar seed flour | 0.03 | 0.03 | 0.03 | 0.03 | |
| Locust bean gum | | | 0.03 | 0.03 | 0.03 |
| Grapefruit flavour | 0.06 | 0.06 | 0.06 | 0.06 | 0.06 |
| Naringenin | 0.0015 | 0.003 | 0.002 | 0.003 | 0.0015 |
| Homoeriodictyol-Na | 0.0015 | | 0.002 | | 0.0015 |
| Water | Fill up ad 100% | | | | |

Production: Dissolve beer base with sugar and water. Add and dissolve further ingredients. Pasteurise and cool down.

The invention claimed is:

1. A food product consisting essentially of:
   (a) juice, flesh or peels or other components of premature and/or HLB-infected oranges, wherein the juice, flesh or peels or other components of the premature and/or HLB-infected oranges comprise:
      at least 0.1 ppm of limonin;
      at least 5 ppm of polymethoxylated flavanones;
      at least 200 ppm of hesperidin; and
      a maximum of 2.5 ppm of naringenin, eriodictyol, or homoeriodictyol;
   (b) at least one 4-hydroxyflavanone of formula (I)

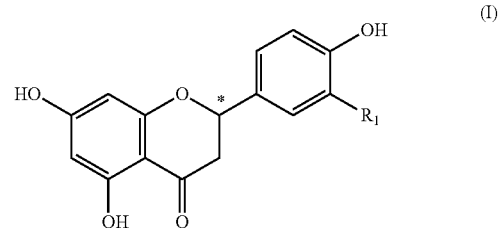

wherein $R_1$ denotes hydrogen or a hydroxy or methoxy group and the carbon atom at the position (C2) marked by * is present in a (2S) or a (2R) configuration or in an arbitrary mixture of both configurations; and
   (c) further flavouring agents or flavour preparations;
      provided that component (b) is present in a sufficient amount to improve the sour and bitter taste of component (a).

2. The food product according to claim 1, characterized in that the food product is a food or a dessert.

3. The food product according to claim 2, characterized in that the food product is a drink selected from the group consisting of freshly pressed, direct juices, reconstituted juices from juice concentrate, nectars, saftschorle, refreshing drinks containing juice, milk products containing juice, carbonised drinks containing juice, and iced tea containing juice.

4. The food product according to claim 2, characterized in that the food product is a dessert selected from the group consisting of a yoghurt, a frozen ice product, a sorbet, ice cream, cream, pudding, filling for chocolate or cookie products, a jam, and a dried juice or fruit preparation.

5. The food product according to claim 1, characterized in that it contains at least one 4-hydroxyflavanone of formula (I) as component (b), which is selected from the group consisting of naringenin, homoeriodictyol and eriodictyol, including the respective stereoisomers.

6. The food product according to claim 1, characterized in that it contains 4-hydroxyflavanones of formula (I), wherein the (2S)- and (2R)-enantiomers are present in a weight ratio of 99:1 to 1:99.

7. The food product according to claim 1, characterized that the juice, flesh or peels or other components comprise naringenin.

8. The food product according to claim 1, characterized that the juice, flesh or peels or other components comprise eriodictyol.

9. The food product according to claim 1, characterized that the juice, flesh or peels or other components comprise homoeriodictyol.

10. A method for reducing the sour and bitter taste of premature and/or HLB-infected oranges consisting essentially of:
(i) providing juice, flesh or peels or other components of premature and/or HLB-infected oranges; and
(ii) adding an amount sufficient to improve the sour and bitter taste of the juice, flesh or peels or other components of the premature and/or HLB-infected oranges of at least one 4-hydroxyflavanone of formula (I),

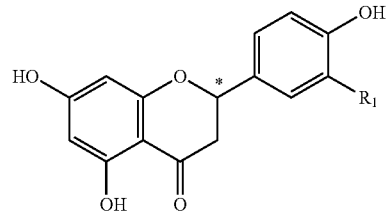

(I)

wherein $R_1$ denotes hydrogen or a hydroxy or methoxy group and the carbon atom at the position (C2) marked by * is present in a (2S) or a (2R) configuration or in an arbitrary mixture of both configurations; and (iii) adding further flavouring agents or flavour preparations;

provided that component (b) is present in a sufficient amount to improve the sour and bitter taste of component (a).

* * * * *